United States Patent
Shaffer

(10) Patent No.: US 6,321,903 B1
(45) Date of Patent: Nov. 27, 2001

(54) SPLICE JOINT FOR PLASTIC COATED FABRIC CONVEYOR BELT AND METHOD OF MAKING THE SAME

(76) Inventor: Curt Shaffer, 1263 Greenwood Ave., Kent, OH (US) 44240

(*) Notice: Subject to any disclaimer, the term of this patent is extended or adjusted under 35 U.S.C. 154(b) by 0 days.

(21) Appl. No.: 09/307,543

(22) Filed: May 7, 1999

Related U.S. Application Data

(60) Provisional application No. 60/084,851, filed on May 8, 1998.

(51) Int. Cl.[7] ............................. B65G 17/00; F16G 3/00
(52) U.S. Cl. ................................. 198/844.2; 474/253
(58) Field of Search ....................... 198/844.2, 803.14, 198/803.15, 834, 835; 474/249, 253

(56) References Cited

U.S. PATENT DOCUMENTS

| | | |
|---|---|---|
| 766,930 | 8/1904 | Clemons . |
| 2,441,460 | 5/1948 | Walters ................ 74/232 |
| 2,792,318 * | 5/1957 | Welch ................... 24/38 |
| 3,288,265 * | 11/1966 | Smith ............ 198/803.14 |
| 3,414,123 * | 12/1968 | Litt et al. ........ 198/803.15 |
| 3,642,120 * | 2/1972 | Duhan ................ 198/834 |
| 3,812,953 * | 5/1974 | Maschke ......... 198/803.15 |
| 4,063,463 | 12/1977 | Nordengren ........ 74/231 J |
| 4,543,080 * | 9/1985 | Tangorra ............. 198/834 |
| 4,721,497 | 1/1988 | Jäger .................... 474/255 |
| 5,092,823 | 3/1992 | Longo .................. 474/253 |
| 5,136,832 | 8/1992 | Sund ..................... 56/364 |
| 5,244,083 * | 9/1993 | Arnold ............. 198/844.2 |
| 5,259,496 * | 11/1993 | Common .......... 198/803.15 |
| 5,342,250 | 8/1994 | Sanders ................ 474/249 |
| 5,487,707 | 1/1996 | Sharf et al. ........... 474/253 |
| 5,697,491 * | 12/1997 | Alex ................... 198/847 |
| 5,806,662 * | 9/1998 | Martin ............. 198/803.15 |

\* cited by examiner

*Primary Examiner*—Dean J. Kramer
(74) *Attorney, Agent, or Firm*—Hahn Loeser + Parks LLP

(57) ABSTRACT

Splice joint for plastic coated fabric conveyor belt or similar article which initially provides a mechanical bond between the two (2) conveyor belt ends to be joined prior to a vulcanization process. This is achieved by providing a "jig-saw puzzle" splice between the two (2) conveyor belt ends to be joined wherein at least one of the conveyor belt ends to be joined has outwardly extending mushroom shaped or arrow-head shaped tabs and the other conveyor belt end to be joined has corresponding inwardly extending sockets to provide both increased splice joint surface area, as well as a mechanical bond, between the two (2) conveyor belt ends to be joined.

20 Claims, 2 Drawing Sheets

SPLICE JOINT FOR PLASTIC COATED FABRIC CONVEYOR BELT AND METHOD OF MAKING THE SAME

This application claims benefit to U.S. Provisional application No. 60/084,851 filed May 8, 1998. Application Ser. No. 60/084,851 is incorporated by reference.

BACKGROUND AND SUMMARY OF THE INVENTION

The present invention relates generally to new and novel improvements in a splice joint for plastic coated fabric conveyor belt and method of making the same. More particularly, the present invention relates to a splice joint for plastic coated fabric conveyor belt and method of making the same which is particularly suitable for use in machines which fabricate metal can lids.

Machines which fabricate metal can lids typically include a continuous conveyor belt to transport and position the metal can lid material during the metal can lid fabrication process. While it would be beneficial to utilize an endless conveyor belt for the continuous conveyor belt in such metal can lid fabricating machines, the design of most metal can lid fabricating machines precludes the use of an endless conveyor belt. In particular, most metal can lid fabricating machines require a conveyor belt to be threaded through the metal can lid fabricating machine around pulleys therein and the two (2) free conveyor belt ends are then brought together and joined together to form a spliced continuous conveyor belt.

Spliced continuous conveyor belts used in metal can lid fabricating machines are sometimes fabricated by joining the two (2) free conveyor belt ends with a straight butt splice joint, often cut at an angle to increase the surface area of the splice joint. Another known prior art method of joining the two (2) free conveyor belt ends involves cutting the two (2) free conveyor belt ends into a configuration commonly referred to as a "finger" type splice. In this configuration, the two (2) conveyor belt ends are typically overlapped and sheared or cut in a matched wavy or "finger" pattern. Such a "finger" type splice can be seen in U.S. Pat. No. 5,342,250 to Sanders for a "Process for the Manufacture of an Endless Transfer Belt." After shearing or cutting the two (2) conveyor belt ends into a matched wavy or "finger" pattern, the conveyor belt is threaded through the metal can lid fabricating machine and the two (2) conveyor belt ends are abutted together and melted to form a continuous spliced conveyor belt. Pre-cut holes or pockets in the conveyor belt transport the metal can lid materials through the metal can lid fabricating machines through various forming operations to fabricate metal can lids having the desired configuration.

Conveyor belts used in metal can lid fabricating machines are often subjected to high levels of tension and stress due to the high speeds at which conveyor belts are driven around the pulleys in typical metal can lid fabricating machines. This may cause conventional spliced continuous conveyor belts to tear, stretch or separate in the vicinity of the splice during normal operating conditions. Since most metal can lid fabricating machines require precise positioning of the metal can lid materials to fabricate metal can lids having the desired configuration, any deviation in the length of the spliced continuous conveyor belt could be detrimental to the metal can lid fabricating process.

In addition, vulcanizing units used to heat known prior art conveyor belts used in metal can lid fabricating machines have a broader than desired heating zone. Such vulcanizing units are generally multi-purpose units and are not designed for spliced continuous conveyor belts having lengths which are fabricated to close dimensional tolerances. Such a broad heating zone tends to deform the conveyor belt and affect the positioning of precision cut drive holes which are prepunched into the conveyor belt. Deformation of these areas can result in misalignment of the metal can lid materials in the forming process and significantly reduce the service life expectancy of the conveyor belt. Thus, it is generally desirable to position the splice between the "holed" areas of the conveyor belt to shield the drive holes from heat from the vulcanizer unit.

In the shearing or cutting process used to fabricate spliced continuous conveyor belts for metal can lid fabricating machines, a pair of sharp shearing or cutting blades, including an upper shearing or cutting blade and a lower shearing or cutting blade, are brought into close proximity to one another. The conveyor belting material that is positioned between the shearing or cutting blades is sheared or cut by the combination of the force applied by the shearing or cutting blades, the hardness of the shearing or cutting blades and the sharpness of the shearing or cutting blade edges. If more than one (1) layer of material lies between the shearing or cutting blades and the upper shearing or cutting blade is brought down towards the lower shearing or cutting blade, the bottom layer of the material becomes the lower shearing plane for the upper layer of material. Since the lower layer of material does not have the hardness and sharpness characteristics of a shearing or cutting blade, it will tend to compress, flow and distort the cut edges of both the upper and the lower material layers.

Vulcanization is a term used to describe the process of joining rubber and/or plastic materials together by heating the materials under an applied pressure in a confined environment to cause the particles in the materials being joined to flow and intermix with each other. As the temperature is reduced, the materials cool and the particles cure together to form a solid bond. In utilizing this process to fabricate a continuous spliced conveyor belt having a straight butt splice joint or a "finger" type splice joint, the wavy or "finger" conveyor belt ends tend to draw away from each other due to the pressure applied during the vulcanization process. This drawing away of the conveyor belt ends can result in less than desirable intermixing of the particles during the vulcanization process, thus forming a joint which is weaker than desirable.

Accordingly, an object of the present invention is the provision of a splice joint for plastic coated fabric conveyor belt or similar article which provides an initial mechanical bond between the two (2) conveyor belt ends to preclude movement or withdrawal of the (2) conveyor belt ends relative to each other during the vulcanization process.

Another object of the present invention is the provision of a splice joint for plastic coated fabric conveyor belt or similar article which utilizes a relatively narrow heat zone to vulcanize the two (2) conveyor belt ends to be joined together and shields the remainder of the conveyor belt from the heat used in the vulcanizing process.

A further object of the present invention is the provision of a splice joint for plastic coated fabric conveyor belt or similar article which provides increased surface area on the two (2) conveyor belt ends in the splice joint zone to provide a stronger bond between the two (2) conveyor belt ends.

Yet another object of the present invention is the provision of a splice joint for plastic coated fabric conveyor belt or similar article which provides for a stronger and more durable splice between the two (2) conveyor belt ends.

Yet a further object of the present invention is the provision of a splice joint for plastic coated fabric conveyor belt or similar article which provides better dimensional accuracy for a continuous spliced conveyor belt fabricated by joining two (2) conveyor belt ends.

These and other objects of the present invention are attained by a splice joint for plastic coated fabric conveyor belt or similar article which initially provides a mechanical bond between the two (2) conveyor belt ends to be joined prior to a vulcanization process. This is achieved by providing a "jig-saw puzzle" type splice joint between the two (2) conveyor belt ends to be joined wherein at least one of the conveyor belt ends to be joined has outwardly extending mushroom shaped tabs and/or outwardly extending arrow-head shaped tabs and the other conveyor belt end to be joined has corresponding inwardly extending sockets to provide both increased splice joint surface area, as well as a mechanical bond, between the two (2) conveyor belt ends to be joined.

DETAILED DESCRIPTION OF THE DRAWINGS

Figure 1:
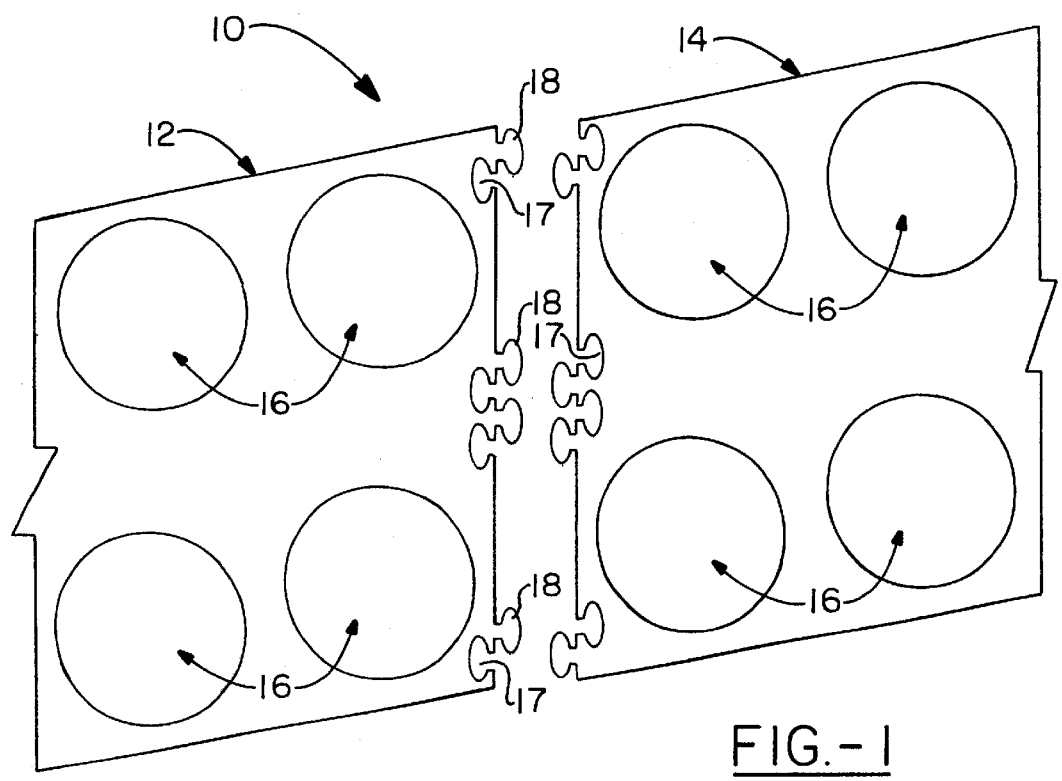
FIG. 1 is a top view of an interlocked pair of representative conveyor belt ends which utilize corresponding male and female mushroom shapes to create an interlocking splice joint in accordance with a first preferred embodiment of a splice joint for plastic coated fabric conveyor belt or similar article and method of making the same in accordance with the present invention.

In the following detailed description of a first preferred embodiment and a second preferred embodiment of the present invention, reference is made to the accompanying drawings which, in conjunction with this detailed description, illustrate and describe a first preferred embodiment and a second preferred embodiment of a splice joint for plastic coated fabric conveyor belt or similar article and method of making the same in accordance with the present invention. Referring first to FIG. 1, which shows a top view of an interlocked pair of representative conveyor belt ends which utilize corresponding male 18 and 17 female mushroom shapes to create an interlocking splice joint in accordance with a first preferred embodiment of a splice joint for plastic coated fabric conveyor belt or similar article and method of making the same in accordance with the present invention, continuous spliced conveyor belt 10 is formed by joining a matched pair of conveyor belt ends 12 and 14 together. The conveyor belting material is preferably a plastic coated Kevlar® fabric material and is typically pre-cut by various methods to provide substantially equidistant conveyor belt drive holes 16 along the length of the conveyor belting material. Conveyor belt drive holes 16 are utilized to both carry the metal can lid material through the forming process and drive continuous spliced conveyor belt 10 around the internal pulleys of the metal can lid fabricating machine. When stamping conveyor belt drive holes 16 into the conveyor belting material, it is preferable that the conveyor belting material be placed under a tensile load during the conveyor belt drive hole shearing or cutting operation which is substantially equivalent to the tensile load the continuous spliced conveyor belt will experience during normal usage. An alternative to this is to pre-cut conveyor belt drive holes 16 in an out of round configuration, slightly wider along their transverse axis than along their longitudinal axis, and with conveyor belt drive holes 16 positioned slightly closer together along their longitudinal axis when the conveyor belt material is in an untensioned or free condition, so conveyor belt drive holes 16 are substantially round and properly positioned relative to each other then continuous spliced conveyor belt 10 is placed under tension during use.

To form continuous spliced conveyor belts 10 and 20, one end of the conveyor belting material is placed inside the left side of a shearing or cutting apparatus over conveyor belt drive hole alignment guides with the free end of the conveyor belting material projecting out of the shearing or cutting apparatus. This cutting or shearing operation can be conducted at substantially the same time conveyor belt drive holes 16 or 26 are formed or, alternatively, as an independent operation, preferably after conveyor belt drive holes 16 or 26 are formed. The configuration of the shearing or cutting blades correspond to the configuration of the desired conveyor belt ends 12 and 14 or 22 and 24. Once the conveyor belting material is properly positioned in the shearing or cutting apparatus, upper shearing or cutting blade and lower shearing or cutting blade are brought together under pressure. Before the shearing or cutting edges come into contact with the conveyor belting material, a spring loaded pressure pad engages the conveyor belting material adjacent to the shearing or cutting area to hold the conveyor belting material firmly in the desired position for shearing or cutting. A blanking style cut with zero (0) degrees of blade rake angle is preferred to prevent distortion of the shear or cut, although other types of shears or cuts could alternatively be used if desired. The clearance between the upper shearing or cutting blade and the lower shearing or cutting blade is preferably set to be less than 0.001 inches. As the upper shearing or cutting blade and the lower shearing or cutting blade engage the conveyor belting material, it is sheared or cut cleanly without a burred edge. Conveyor belt end 14 or 24 is then placed in the right side of the shearing or cutting apparatus and is aligned and sheared or cut in the same fashion as described above in connection with conveyor belt end 12 or 22. The end result of this conveyor belt end shearing or cutting process are two (2) matching and opposed conveyor belt ends 12 and 14 or 22 and 24 which can be subsequently interlocked prior to vulcanization.

Figure 3:
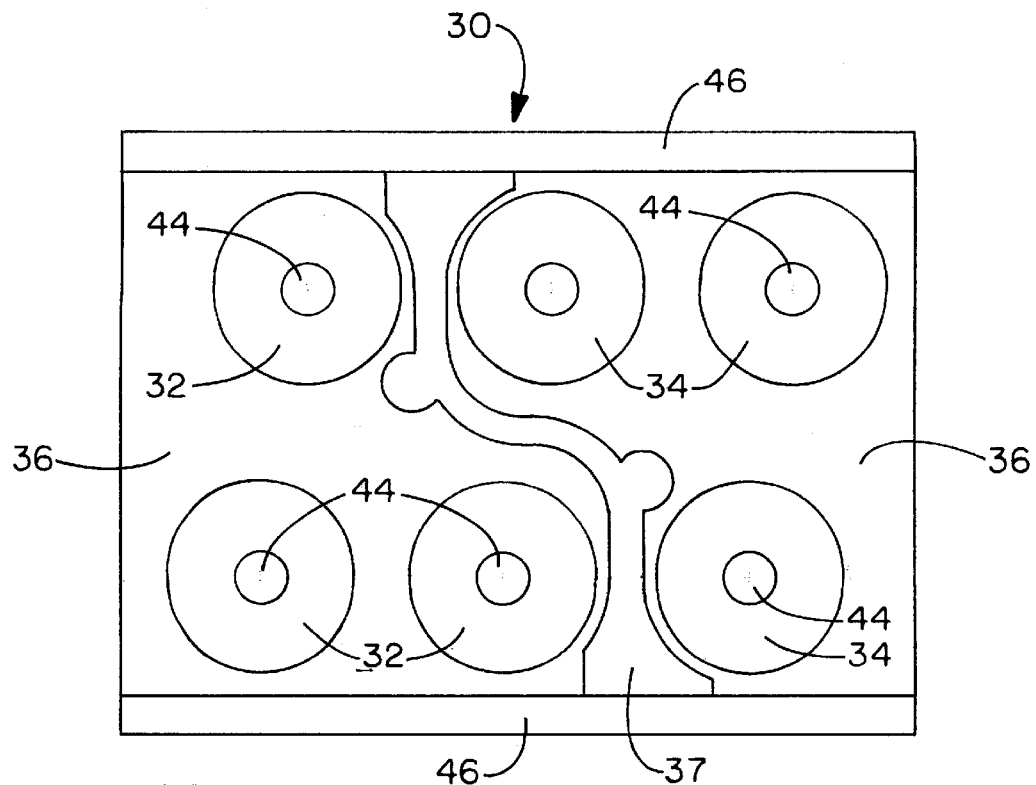
FIG. 3 is a top view of a lower insert plate which utilizes pin tooling and edge guides to properly align and contain the interlocking splice joint during vulcanization in accordance with the first preferred embodiment and the second preferred embodiment of a splice joint for plastic coated fabric conveyor belt or similar article and method of making the same in accordance with the present invention, shown in FIGS. 1 and 2, respectively.
Figure 4:
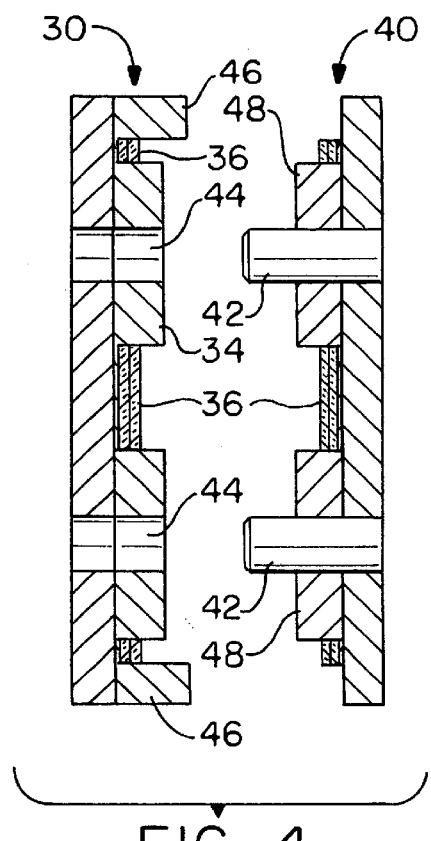
FIG. 4 is a cross-sectional side view of the lower insert plate and a corresponding upper insert plate which utilizes pin tooling and edge guides to properly align and contain the interlocking splice joint during vulcanization in accordance with the first preferred embodiment and the second preferred embodiment of a splice joint for plastic coated fabric conveyor belt or similar article and method of making the same in accordance with the present invention, shown in FIGS. 1 and 2, respectively.

Conveyor belting material is then threaded through the metal can lid fabricating machine around the interior pulleys and conveyor belt end 12 or 22 and conveyor belt end 14 or 24 are positioned in the vulcanizing area. The pulley tension of the metal can lid fabricating machine is preferably relaxed to provide slack in the conveyor belting material which enables temporary insertion of a lower portion of a standard vulcanizing unit for the joining process. Referring to FIGS. 3 and 4, which show a top view of a lower insert plate which utilizes pin tooling and edge guides to properly align and contain the interlocking splice joint during vulcanization in accordance with the first preferred embodiment and the second preferred embodiment of a splice joint for plastic coated fabric conveyor belt or similar article and method of making the same in accordance with the present invention and a cross-sectional side view of the lower insert plate and a corresponding upper insert plate which utilizes pin tooling and edge guides to properly align and contain the interlocking splice joint during vulcanization in accordance with the first preferred embodiment and the second preferred embodiment of a splice joint for plastic coated fabric conveyor belt or similar article and method of making the same in accordance with the present invention, respectively, lower heat resistant insert plate 30 is then placed on top of the heating surface of the lower portion of the vulcanizer unit. Conveyor belt end 12 or 22 is then placed over the appropriate projections 32 on the left side of lower heat resistant insert plate 30 and conveyor belt end 14 or 24 is interlocked with conveyor belt end 12 or 22 and is also situated over appropriate projections 34 on the right side of the lower heat resistant insert plate 30. Conveyor belt end 12 or 22 and conveyor belt end 14 or 24 are thus mechanically locked in both edge to edge alignment and center to center alignment with a contoured heating strip 37 being positioned directly below the splicing area. Insulative material 36 is preferably provided in lower heat resistant insert plate 30 to preclude and minimize heat transfer from the vulcanizer unit to continuous spliced conveyor belt 10 or 20 except in the vicinity of the splice joint to preclude and minimize excessive distortion of continuous spliced conveyor belt 10 or 20 in the vicinity of the splice joint. An adhesive may be applied to the face of conveyor belt end 12 or 22 and conveyor belt end 14 or 24 prior to interlocking conveyor belt end 12 or 22 and conveyor belt end 14 or 24 if desired or necessary to create the desired cure between conveyor belt end 12 or 22 and conveyor belt end 14 or 24.

It should be recognized that other shapes for the contoured heating strip could alternatively be utilized to fabricate continuous spliced conveyor belt 10 or 20. In general, a particular shape for the contoured heating strip is chosen by weighted comparisons of the cost to produce the configuration with the overall effectiveness of different configurations. The shape of contoured heating strip is preferably substantially the same as the configuration of conveyor belt end 12 or 22 and conveyor belt 14 or 24 and is slightly larger than the splice area.

Figure 2:
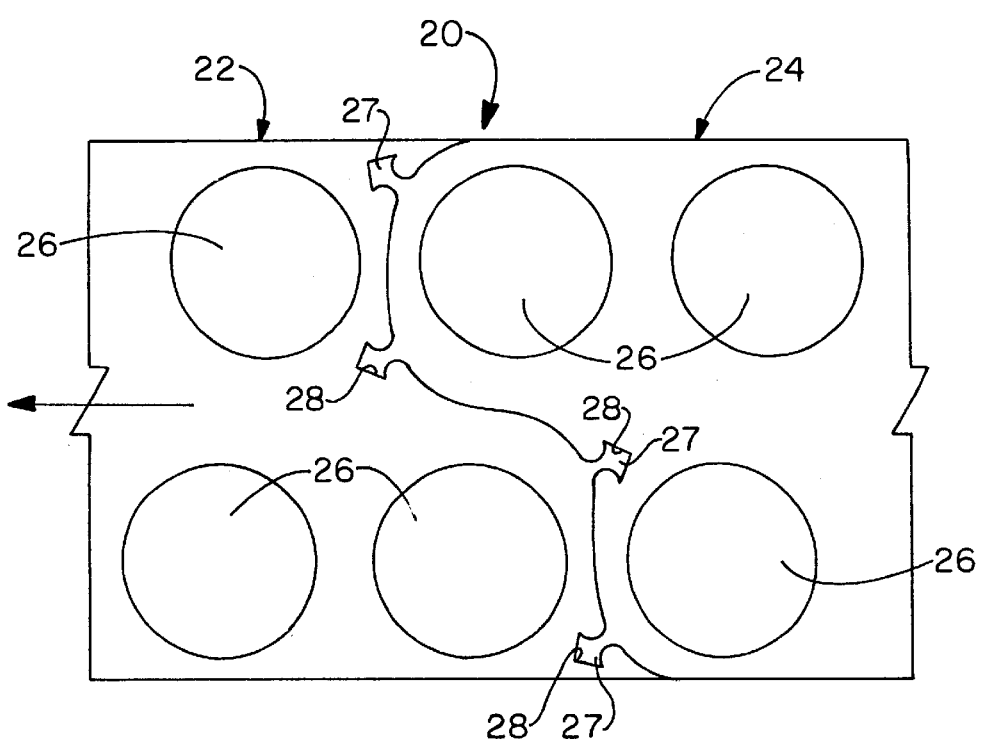
FIG. 2 is a top view of an interlocked pair of representative conveyor belt ends which utilize corresponding male and female arrow-head shapes to create an interlocking splice joint in accordance with a second preferred embodiment of a splice joint for plastic coated fabric conveyor belt or similar article and method of making the same in accordance with the present invention.

To reduce the possibility of the splice joint splitting or tearing from wear and tension as continuous spliced conveyor belt 10 or 20 travel over pulleys in the metal can lid fabricating machine, the shape of the splice cut can be modified, if desired, to incorporate a staggered "S" shape, as shown in FIG. 2, which positions the splice joint in front of one conveyor belt drive hole 16 or 26 and behind the adjacent conveyor belt drive hole 16 or 26. Thus, as the drive pins on the metal can lid fabricating machine's pulleys enter conveyor belt drive holes 16 or 26, the staggered "S" shaped splice joint precludes or minimizes back tension from simultaneously pulling across the entire length of the splice joint. The staggered "S" shape also allows for greater spacing between the splice joint and conveyor belt drive holes 16 or 26 than a straight bias cut would provide. Furthermore, the staggered "S" shape provides a curve at each end of the splice joint as it approaches the outer and inner edges of continuous spliced conveyor belt 10 or 20 which is primarily oriented in a direction opposite to the direction of conveyor belt travel. Providing a curve at the ends of the splice joint which is primarily oriented in a direction opposite to the direction of conveyor belt travel reduces the possibility of the splice joint in continuous spliced conveyor belt 10 or 20 splitting or becoming separated at the edges of the continuous conveyor belt, a problem which is commonly associated with traditional straight butt and finger type splice joints. The curvature at the ends of the splice joint also precludes or minimizes a catch point which is created by traditional finger type splice joints which come to a sharp point at one or more edges of the continuous conveyor belt which tend to peel during use. One other advantage of having curvature at the ends of the splice joint is that the splice joint is positioned further from conveyor belt drive holes 16 and 26 which significantly reduces the linear stress at the ends of the splice joint.

Upper heat resistant insert plate 40 is then inserted onto the top surface of the conveyor belting material. Projections 48 downwardly extending from the bottom of upper heat resistant insert plate 40 are positioned firmly inside the top half of conveyor belt drive holes 16 or 26 to properly position upper heat resistant insert plate 40 along the length of the splice joint. Locating pins 42 downwardly extending from upper heat resistant insert plate 40 correspond with openings 44 in lower heat resistant insert plate 30 to provide accurate positioning of lower heat resistant insert plate 30 and upper heat resistant insert plate 40 over and under continuous spliced conveyor belt 10 or 20. Edge guides 46 upwardly extending from lower heat resistant insert plate 30 align and contain the edges of continuous spliced conveyor belt 10 or 20 and preclude or minimize melted plastic from extruding out of the splice joint area.

The top portion of the vulcanizer unit is then placed on top of upper heat resistant insert plate 40 and the top and bottom portions of the vulcanizer unit are fastened together. The vulcanizer unit is then pressurized, typically with air, to further sandwich and position conveyor belt end 12 or 22 and conveyor belt end 14 or 24. Heat is then applied to the heat strips by the vulcanizer unit and conveyor belt end 12 or 22 and conveyor belt end 14 or 24 heat up to a temperature of, for example, approximately 350° F. and their particles intermix. As heat is removed, the conveyor belt splice joint area cools and conveyor belt end 12 or 22 and conveyor belt end 14 or 24 cure to form a strong chemical bond therebetween. The vulcanizer unit and the heat plates are then removed from conveyor belt end 12 or 22 and conveyor belt end 14 and 24, thus forming continuous spliced conveyor belt 10 or 20 having good dimensional accuracy for both edge to edge alignment and conveyor belt drive hole 16 or 26 to conveyor belt drive hole 16 or 26 distance over the conveyor belt splice joint area. In addition, conveyor belt drive holes 16 or 26 near the conveyor belt splice joint area are not distorted and the conveyor belt splice area is substantially imperceptible in relation to the remainder of continuous spliced conveyor belt 10 or 20.

Since the conveyor belt splice joint area inherently has the weakest tensile strength of a properly manufactured continuous spliced conveyor belt, it is also the area most prone to stress induced failure. Thus, improving the tensile strength of the conveyor belt splice joint area increases the service life expectancy of the continuous spliced conveyor belt which in turn improves productivity and profitability by reducing metal can lid fabricating machine downtime, as well as wear and tear on the forming dies and the internal components of metal can lid fabricating machines.

Accordingly, although the present invention has been described above in detail, the same is by way of illustration and example only and is not to be taken as a limitation on the present invention. For example, rather than utilizing corresponding male and female mushroom shapes or arrowhead shapes for the "jig-saw puzzle" type splice joint, other configurations could alternatively be used. In addition, one side of the conveyor belt end could include all male projections and the other conveyor belt end could include all female sockets if desired. Thus, it is apparent to those having a level of ordinary skill in the relevant art that other variations and modifications in the construction of the splice joint for plastic coated fabric conveyor belt or similar article and method of making the same could be readily made using the teachings of the present invention. Accordingly, the scope and content of the present invention are to be defined only by the terms of the appended claims.

What is claimed is:

1. A continuous spliced conveyor belt, comprising a length of conveyor belt material having a first end and a second end, said length of conveyor belt material includes at least one pair of adjacent conveyor belt drive holes, the first hole of said at least one pair of adjacent conveyor belt drive holes being offset in a direction which is transverse to the length of the conveyor belt material from the second hole of said at least one pair of adjacent conveyor belt drive holes, each hole of said at least one pair of adjacent conveyor drive belt holes having a front, back, first side and second side, the front and back of a hole being oriented in a direction parallel to the length of the conveyor belt, and said first end of said conveyor belt material and said second end of said conveyor belt material are joined together to form a splice joint, said splice joint being continuous and positioned in front of the first hole of said at least one pair of adjacent conveyor belt drive holes, extending between sides of both holes of said at least one pair of adjacent conveyor belt drive holes, and being positioned behind the second hole of said at least one pair of adjacent conveyor belt drive holes.

2. The continuous spliced conveyor belt in accordance with claim 1, wherein said splice joint has a substantially staggered "S" shape.

3. The continuous spliced conveyor belt in accordance with claim 2, wherein said continuous spliced conveyor belt is fabricated from a plastic coated Kevlar® material.

4. The continuous spliced conveyor belt in accordance with claim 3, wherein said conveyor belt material is pre-cut to provide a plurality of substantially equidistant conveyor belt drive holes along the length of said conveyor belt material, the conveyor belt drive holes being arranged in at least two rows extending along the length of the conveyor belt material.

5. The continuous spliced conveyor belt in accordance with claim 1, wherein said continuous spliced conveyor belt is fabricated from a plastic coated Kevlar® material.

6. The continuous spliced conveyor belt in accordance with claim 1, wherein said conveyor belt material is pre-cut to provide a plurality of substantially equidistant conveyor belt drive holes along the length of said conveyor belt material, the conveyor belt holes being arranged in at least two rows extending along the length of the conveyor belt material.

7. The continuous spliced conveyor belt according to claim 1, wherein the first hole of said at least one pair of adjacent conveyor belt drive holes is offset in a direction which is parallel to the length of the conveyor belt material from the second hole of said at least one pair of adjacent conveyor belt drive holes.

8. A continuous spliced conveyor belt, comprising a length of conveyor belt material having a plurality of conveyor belt drive holes formed therein, said plurality of conveyor drive holes are formed in an out of round configuration with said conveyor belt material in an untensioned state such that said conveyor belt drive holes are substantially round when said continuous spliced conveyor belt is placed under tension during use.

9. The continuous spliced conveyor belt in accordance with claim 8, wherein said continuous spliced conveyor belt includes a splice joint having a substantially staggered "S" shape.

10. The continuous spliced conveyor belt in accordance with claim 9, wherein said continuous spliced conveyor belt is fabricated from a plastic coated Kevlar® material.

11. The continuous spliced conveyor belt in accordance with claim 10, wherein said conveyor belt material is pre-cut to provide said plurality of conveyor belt drive holes.

12. The continuous spliced conveyor belt in accordance with claim 8, wherein said continuous spliced conveyor belt is fabricated from a plastic coated Kevlar® material.

13. The continuous spliced conveyor belt in accordance with claim 8, wherein said conveyor belt material is pre-cut to provide said plurality of conveyor belt drive holes.

14. A continuous spliced conveyor belt, comprising a length of conveyor belt material having a plurality of conveyor belt drive holes formed therein, said plurality of conveyor drive holes are formed in a substantially round configuration while said conveyor belt material is being retained in a tensioned state which is substantially equal to the tension said continuous spliced conveyor belt is expected to experience during use.

15. The continuous spliced conveyor belt in accordance with claim 14, wherein said continuous spliced conveyor belt includes a splice joint having a substantially staggered "S" shape.

16. The continuous spliced conveyor belt in accordance with claim 15, wherein said continuous spliced conveyor belt is fabricated from a plastic coated Kevlar® material.

17. The continuous spliced conveyor belt in accordance with claim 16, wherein said conveyor belt material is pre-cut to provide said plurality of conveyor belt holes.

18. The continuous spliced conveyor belt in accordance with claim 14, wherein said continuous spliced conveyor belt is fabricated from a plastic coated Kevlar® material.

19. The continuous spliced conveyor belt in accordance with claim 14, wherein said conveyor belt material is pre-cut to provide said plurality of conveyor belt drive holes.

20. A method of forming a continuous spliced conveyor belt, comprising the steps of:

providing a length of conveyor belt material having a first end and a second end;

forming at least one pair of adjacent conveyor belt drive holes in said length of conveyor belt material, the first hole of said at least one pair of adjacent conveyor belt drive holes being offset in a direction which is transverse to the length of the conveyor belt material from the second hole of said at least one pair of adjacent conveyor belt drive holes, each hole of said at least one pair of adjacent conveyor drive belt holes having a front, back, first side and second side, the front and back of a hole being oriented in a direction parallel to the length of the conveyor belt; and joining said first end of said conveyor belt material and said second end of said conveyor belt material together to form a continuous splice joint therebetween, said splice joint is being positioned in front of the first hole of said at least one pair of adjacent conveyor belt drive holes, extending between sides of both holes of said at least one pair of adjacent conveyor belt drive holes, and being positioned behind the second hole of said at least one pair of adjacent conveyor belt drive holes.

* * * * *